United States Patent
Veal et al.

(10) Patent No.: US 9,054,987 B2
(45) Date of Patent: *Jun. 9, 2015

(54) SINGLE INSTRUCTION PROCESSING OF NETWORK PACKETS

(71) Applicant: Intel Corporation

(72) Inventors: Bryan E. Veal, Beaverton, OR (US); Travis T. Schluessler, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,085

(22) Filed: Jun. 25, 2013

(65) Prior Publication Data

US 2014/0036909 A1    Feb. 6, 2014

Related U.S. Application Data

(63) Continuation of application No. 12/317,844, filed on Dec. 30, 2008, now Pat. No. 8,493,979.

(51) Int. Cl.
| | |
|---|---|
| *H04L 12/28* | (2006.01) |
| *H04L 12/947* | (2013.01) |
| *G06F 9/38* | (2006.01) |
| *H04L 12/861* | (2013.01) |

(52) U.S. Cl.
CPC .............. *H04L 49/25* (2013.01); *G06F 9/3885* (2013.01); *G06F 9/3887* (2013.01); *H04L 49/9094* (2013.01)

(58) Field of Classification Search
None
See application file for complete search history.

(56) References Cited

U.S. PATENT DOCUMENTS

| | | | |
|---|---|---|---|
| 5,210,705 | A  | 5/1993  | Chauvel et al. |
| 5,887,183 | A  | 3/1999  | Agarwal et al. |
| 6,366,998 | B1 | 4/2002  | Mohamed |
| 6,631,422 | B1 | 10/2003 | Althaus et al. |
| 6,922,716 | B2 | 7/2005  | Desai et al. |
| 7,003,593 | B2 | 2/2006  | Huppenthal et al. |
| 7,506,135 | B1 | 3/2009  | Mimar |
| 7,627,744 | B2 | 12/2009 | Maher et al. |
| 7,917,727 | B2 | 3/2011  | Rhoades et al. |
| 7,984,247 | B2 | 7/2011  | Furtek et al. |
| 2002/0040378 | A1 | 4/2002 | Symes et al. |
| 2003/0014457 | A1 | 1/2003 | Desai et al. |
| 2003/0140212 | A1 | 7/2003 | Stein et al. |
| 2005/0223196 | A1 | 10/2005 | Knowles |
| 2007/0028076 | A1 | 2/2007  | Wezelenburg |

(Continued)

FOREIGN PATENT DOCUMENTS

| | | |
|---|---|---|
| WO | 2010/077953 A2 | 7/2010 |
| WO | 2010/077953 A3 | 9/2010 |

OTHER PUBLICATIONS

Office Action Received for Chinese Patent Application No. 200980153569.9, mailed on Nov. 5, 2013, 3 Pages of Chinese Office Action and 5 Pages of English Translation.

(Continued)

*Primary Examiner* — Bob Phunkulh
(74) *Attorney, Agent, or Firm* — Kacvinsky Daisak Bluni PLLC

(57) ABSTRACT

Executing a single instruction/multiple data (SIMD) instruction of a program to process a vector of data wherein each element of the packet vector corresponds to a different received packet.

23 Claims, 4 Drawing Sheets

(56) References Cited

U.S. PATENT DOCUMENTS

| | | | |
|---|---|---|---|
| 2008/0086575 | A1 | 4/2008 | Foong et al. |
| 2008/0282058 | A1 | 11/2008 | Maher et al. |
| 2009/0172349 | A1 | 7/2009 | Sprangle et al. |
| 2010/0033493 | A1 | 2/2010 | Nutter et al. |
| 2011/0087859 | A1 | 4/2011 | Mimar |

OTHER PUBLICATIONS

Office Action received for U.S. Appl. No. 12/317,844, mailed on May 23, 2012, 18 Pages.
Office Action received for U.S. Appl. No. 12/317,844, mailed on Dec. 14, 2011, 12 Pages.
Office Action received for U.S. Appl. No. 12/317,844, mailed on Nov. 8, 2012, 11 Pages.
International Preliminary Report on Patentability received for PCT Application No. PCT/US2009/068270, Mailed on Jul. 14, 2011, 6 pages.
Lai, Yu-Kuen, "Packet Processing on Stream Architecture", 2006. Retrieved from http:/frepository.lib.ncsu.edulir/bitstream/1840.16/3002/1/etd.pdf ; 143 pages.
Seamans, Elizabeth et al. "Chapter 35. Fast Virus Signature Matching on GPU", Dec. 2007. Retrieved from http:/fhttp.developer.nvidia.com/GPUGems3/gpugems3_ch35.html ; 9 pages.
Office Action Received for Chinese Patent Application No. 200980153569.9, mailed on Feb. 28, 2013, 8 Pages of Chinese Office Action and 12 Pages of English Translation.
Veal et al, U.S. Appl. No. 12/317,844, titled "SIMD Processing of Network Packets", filed Dec. 30, 2008, 23 pages.
Notice of Allowance received for U.S. Appl. No. 12/317,844, mailed on Mar. 26, 2013, 7 Pages.
Supplemental Notice of Allowability received for U.S. Appl. No. 12/317,844, mailed on Jun. 13, 2013, 5 Pages.
International Search Report and Written Opinion received for PCT Application No. PCT/US2009/068270, Mailed on Aug. 6, 2010, 7 pages.
Office Action Received for Chinese Patent Application No. 200980153569.9, mailed on Jul. 2, 2014, 5 Pages of Chinese Office Action and 7 Pages of English Translation.
Office Action Received for Chinese Patent Application No. 200980153569.9, mailed on Jan. 13, 2015, 8 Pages of Chinese Office Action and 11 Pages of English Translation.

SINGLE INSTRUCTION PROCESSING OF NETWORK PACKETS

This application claims priority to and is a continuation of U.S. patent application Ser. No. 12/317,844 entitled "SINGLE INSTRUCTION PROCESSING OF NETWORK PACKETS", filed on Dec. 30, 2008.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network forwarding devices (e.g., "routers", "bridges" and/or "switches") before reaching its destination. These intermediate devices often perform a variety of packet processing operations. For example, intermediate devices often perform packet classification to determine how to forward a packet further toward its destination or to determine the quality of service to provide.

Processing packets creates a variety of computational burdens. For example, on intermediate nodes, forwarding or filtering decisions need to be made for each packet. The heavy volume of network traffic makes fast processing of packets of vital importance. Likewise, packet processing consumes processing resources at the packet's destination where the payloads of packets are "unloaded" and reassembled into a stream of data for an application. As speeds increase, the burden of processing network traffic can rob applications of processor resources.

DETAILED DESCRIPTION

Many processors provide Single-Instruction/Multiple-Data (SIMD) instructions. For instance, Intel's IA (Intel Architecture) processors provide an instruction set known as "Streaming SIMD Extensions" (SSE). A SIMD instruction simultaneously performs the same operation on each element in a vector of elements. As an example, a single SIMD ADD instruction may add some number to each of a set of different numbers in a vector. SIMD instructions typically include basic Boolean, Arithmetic, and Compare operations.

Since the vast majority of packets undergo the same operations, SIMD instructions can be used to speed processing of network packets. For example, at an end node, each Internet Protocol (IP) datagram encapsulating a Transmission Control Protocol (TCP) segment undergoes validation (e.g., verification of a checksum) and reassembly to reorder payloads into the originally transmitted data stream. Similarly, en route across a network, a lookup process may determine forwarding information for each received Ethernet frame or IP datagram.

Figure 1:
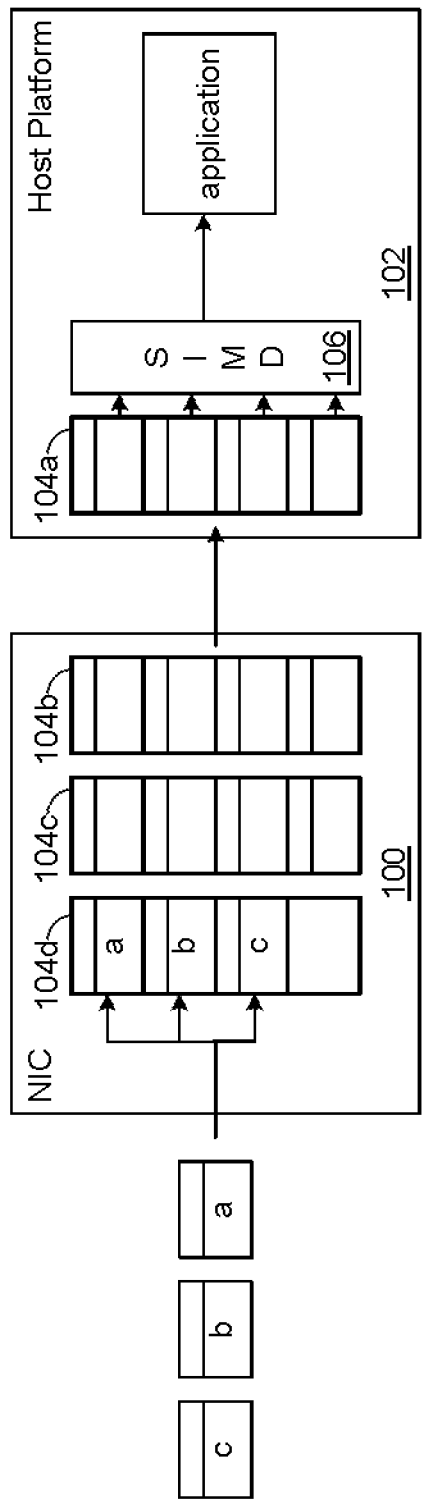
FIG. 1 is a diagram illustrating packet processing using SIMD (Single-Instruction/Multiple-Data) instructions.

FIG. 1 depicts a sample system that uses SIMD instructions to process a vector of multiple network packets. By operating on each of the network packets in parallel, the SIMD instructions can offer a considerable increase in throughput when compared to serial processing of each packet in turn.

In greater detail, FIG. 1 depicts a system that includes a network interface controller 100 (NIC) that receives packets on behalf of host platform 102. Typically a NIC 100 comprises an interface (e.g., xMII [Media Independent Interface or XAUI [Attachment Unit Interface]) that connects a PHY (e.g., a wireless, optic, or wire physical layer device) to a Media Access Controller (MAC). NICs typically include a DMA (Direct Memory Access) engine to transfer data to/from host platform 102 memory. A NIC may be a discrete component, integrated on a motherboard, and/or on a die also integrating a processor or processor cores. Additionally, some NIC functionality may be implemented as program instructions executed by a processor core. NIC architectures vary significantly, for example, some feature offload engines, programmable processors, and/or packet processing hardware assist circuitry.

Host platform 102 can include typical components such as memory, a chipset, and so forth though computing architectures vary greatly. As shown, the host platform includes logic 106 to perform SIMD processing. For example, the logic 106 may be a programmed CPU (Central Processing Unit) or core. For instance, the SIMD 106 logic may be program instructions of a protocol stack, operating system, or a device driver. After SIMD 106 processing, packet data can be consumed by an application, for example, via a socket.

In the example shown, the NIC 100 arranges received packets into vectors 104a-104d for SIMD 106 processing. For example, as shown, packets "a", "b", and "c" are inserted into vector 104d. In some implementations, the NIC 100 may serially add packets to a vector until the vector is full. However, the NIC 100 may also feature logic to selectively assign packets to the vectors 104. For example, the NIC 100 may feature different vectors for data path and connection management packets since such packets typically undergo different operations. Likewise, the NIC 100 may perform classification to ensure that packets from the same flow are not placed in the same vector 104. For example, the NIC 100 may determine a packets TCP/IP tuple (e.g., IP source and destination addresses and TCP source and destination port) to prevent TCP/IP packets from the same connection from being assigned to the same vector. This can reduce contention issues from multiple attempted updates to the same flow state data (e.g., a TCP Control Block [TCB]). In other circumstances, the NIC 100 may populate vectors where each packet within the vector is from the same flow. Such operation may improve the speed of some operations by keeping flow state information in local memory.

As shown, the NIC 100 transfers packet vectors (e.g., vector 104a) to the host platform 102 for processing. A variety of mechanisms can control the initiation of the transfer. For example, transfer may occur once a vector at the head of a vector queue is full, once a timer has expired, or other interrupt moderation technique. The NIC 100 may perform the transfer via DMA (Direct Memory Addressing) into host platform 102 accessible memory and/or by a DCA (Direct Cache Access) push into the cache of a host platform 102 processor. The NIC 100 may then generate an interrupt which triggers host platform 102 processing of the packets. While FIG. 1 depicts vectors 104a-104d assembled in the NIC 100, the NIC 100 may instead initially assemble a vector in 104a by using DMA to rearrange packet data into contiguous vector memory locations in host platform 102.

The SIMD 106 logic can implement a wide variety of packet processing operations. For example, a non-exhaustive list of such operations includes: checking the IP protocol version (e.g., IPv4 or IPv6) to select the packet processing implementation to use; checking the IP header length to determine the offset of the next header of a fragmented datagram; checking whether the IP type of service requires special processing; checking whether the length of the datagram is valid; checking whether the packet is fragmented; checking the offset of a fragmented packet for correct reassembly; checking whether the time-to-live has expired; checking whether the checksum is valid; checking whether the source and destination addresses are valid; checking the next-level protocol (e.g., TCP or UDP); computing table lookups such as using a hash function for identifying packet destination to check whether the packet should be delivered locally, forwarded, or dropped; identifying a core or specific processing element on which the destination application for a receive packet is to be delivered (e.g., Receive Side Scaling [RSS]); identifying an outgoing I/O interface (such as a specific NIC) on which to send a transmit data buffer; computing and recording the checksum for transmission; assigning protocol version, type of service, length, fragmentation, time-to-live, protocol, current timestamp, addresses, port numbers, sequence numbers, and fields for outgoing packets; checking whether source and destination ports correspond to open connections; checking whether the sequence number is correct and corresponds to in-order data, out-of-order data, or duplicate data; updating the congestion window beginning, end, and size; updating the round-trip time based on the packet's timestamp; determining the transmit or receive queues on which to place packet data buffers; and/or inserting packet data buffers onto transmit or receive queues.

While many of the examples above are relevant to TCP/IP, other protocols at different layers both higher and lower in a protocol stack may similarly be implemented to process packet vectors using SIMD 106 logic. For example, Asynchronous Transfer Mode (ATM) cells, Ethernet frames, ARP (Address Resolution Protocol) messages, and/or User Datagram Protocol (UDP) datagrams, to name just a few, may undergo SIMD operations. Packets using the different protocols may be directed to different sets of vectors (e.g., TCP/IP packets assigned to one set of vectors, ATM to another, and so forth) and may traverse different code paths. Based on the packet rate or number of flows, the NIC 100 or the host platform 102 software may dynamically change the size of packet and metadata vectors used and may choose SIMD instructions which operate on a particular vector size.

Additionally, while the above described a sample implementation, other implementations may distribute operation across system components differently. For example, operations described as being performed by the NIC 100 may be performed by host platform 102, enabling the SIMD scheme to work with traditional NIC 100 architectures. That is, the NIC 100 may conventionally transfer packets to the host platform 102 which assigns the packets to vectors for processing. Additionally, the NIC 100 itself may feature a SIMD processor, for example, to terminate TCP or to perform Receive Side Offload (RSO) which assembles multiple received packets into a larger single packet.

In addition to conventional SIMD instructions, SIMD instructions specific to network or I/O tasks may be used. For example, a CRC (cyclic redundancy check) may be computed for a vector of packets using a single SIMD CRC instruction. Other instructions may compute a hash, perform encryption/decryption, string matching, and other operations. For example, an instruction to perform a partial TCP checksum on a vector of TCP packets may be defined as:

vpartchecksum v1{k1},v2 where the instruction computes a partial TCP checksum on the first 8 bytes of each element in the vector of packet data in v2 and adds the partial checksum results to the running checksum found in v1. The resulting ones complement sum is masked by optional vector mask k1, and the corresponding results stored in v1. For example, a TCP checksum for a set of packets could be determined based on the following pseudo-code, where vector v1 stores the running checksum, vector v2 stores the packet length remaining to be checksummed, and vector v3 indexes through the packet data:

```
loop_start:
  vcmp v2, k1, 16, gt
  // compare the packet_lengths in v2 against 16, for
  every packet with length remaining, set the
  corresponding bit in k1
  vpartchecksum v1, k1, v2
  // compute the partial checksum on the next 16 bytes
  of data for the packets that still have data
  remaining
  vsub v2, k1, 16
  // vector subtract 16 off the amount of data
  remaining to be checksummed for each packet
  vadd v3, k1, 16
  // increment the iterators to point to the next chunk
  of data to be checksummed
  bnz k1, loop_start
  // loop until we've finished the checksum on all the
  packets in the vector
```

Of course, this and other instructions may have very different syntaxes and perform other operations.

FIG. 1 depicts vectors 104 that store the entire packet header, however, other implementations may vary. For example, typically, vectors 104 may only store packet headers separated from the packet payloads. The payloads may be stored (e.g., DMA-ed) to host platform 102 memory.

Figure 2:
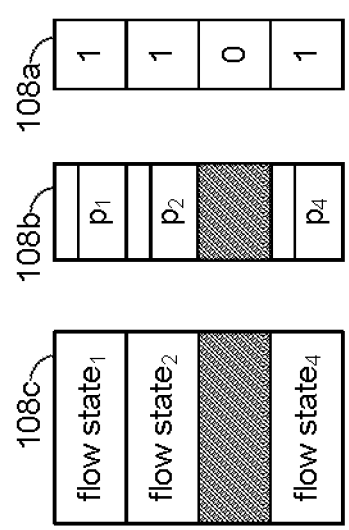
FIG. 2 is a diagram illustrating a set of packet vectors.

While FIG. 1 depicted only vectors of packets, other vectors may be used. For example, as described above, a given packet vector may not be fully populated, for example, when an interrupt moderation time period expires before a packet is assigned to each vector element. To distinguish empty vector elements from populated ones, FIG. 2 depicts a packet vector 108b and an occupancy mask 108a. The occupancy mask 108a elements have a one to one relationship with packet vector 108b elements. Each occupancy mask 108a element identifies whether a network packet was inserted into a corresponding packet vector 108b element. In the example shown, the packet vector 108b includes packets p1, p2, and p4 with the third element vacant (shaded). This vacancy is indicated by a corresponding "0" in the occupancy mask 108a. Where a packet does not exist in the packet vector, there may instead be an emulated packet so that SIMD operations may still be performed on the vector 108b. The emulated packet can be discarded when processing is done.

Processing for some packets may diverge from the processing of the other packets in a vector. For example, TCP segments having the "urgent" flag set may be individually handled or a packet may be moved to a different vector based on packet type (e.g., after IP processing, encapsulated UDP packets may be processed in different vectors than TCP segments). These packets may be temporarily or permanently removed from SIMD processing to be processed sequentially (e.g., thereafter entirely processed by MIMD (multiple instruction/multiple data) instructions) or transferred to other vectors. An emulated packet may be substituted into the packet vector where the divergent packet was removed. If and when the divergence completes, the packet may be reinserted into the packet vector and the denotation removed from the occupancy mask.

FIG. 2 additionally depicts another vector 108c that stores flow state information (e.g., a TCB) for corresponding packets in vector 108b. The flow state may be copied from its original memory into the flow state vector 108c. Changes to the flow state data may be written back to the original memory when processing completes. Additional vectors (not shown) may also be used. For instance, a vector of packet metadata may be used to store information such as the payload address, a hash of a header tuple, and other data associated with or derived from a packet. In addition to vectors discussed above, packet processing operations may use additional vectors as needed and/or rearrange vector information as necessary.

Figure 3:
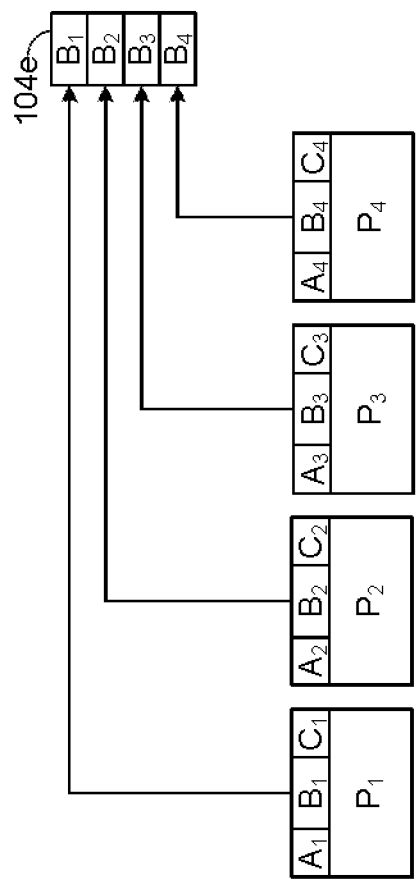
FIG. 3 is a diagram illustrating a vector formed by transposed packet data.

FIG. 1 depicted a vector where each vector element corresponded to a packet. However, SIMD processing may benefit if a vector stores a particular field extracted from each of a set of packets and/or packet metadata. For example, FIG. 3 depicts packets $P_1$-$P_4$ each with header fields A, B, and C. As shown, a vector 104a can be constructed from field B of each packet. For instance, each vector 104a element may be a TCP sequence number of the packets. An implementation may feature many such vectors to reflect the different fields operated on. In other words, data from a single packet may be distributed across many such vectors. Some implementations may operate on vectors formed by combined fields rather than individual fields, for example, based on the size of field SIMD instructions expect. For example, it may be preferable to combine all of the single-bit TCP flags into a single combined field. While FIG. 3 is described as operating on header fields, other fields within a payload may be used, for example, to support deep packet inspection.

Generally, a NIC will receive packet data from a PHY as a sequence of bits spanning the entire packet. Transposing the packet bits from a monolithic set of packet bits to one or more field vectors may be performed by hardwired or programmable circuitry on the NIC 100. However, another implementation may use DMA/DCA to arrange packet fields into vectors. For example, a first packet header field may be transferred to memory address A (element 1 of a vector) while a second packet header field may be transferred to memory address A+[field width] (element 2 of the vector). In other words, instead of NIC circuitry to physically construct the vectors, the transposition of packets into field vectors occurs automatically by using different address logic in the PHY and a DMA/DCA engine to read/write packet data.

Figure 4:
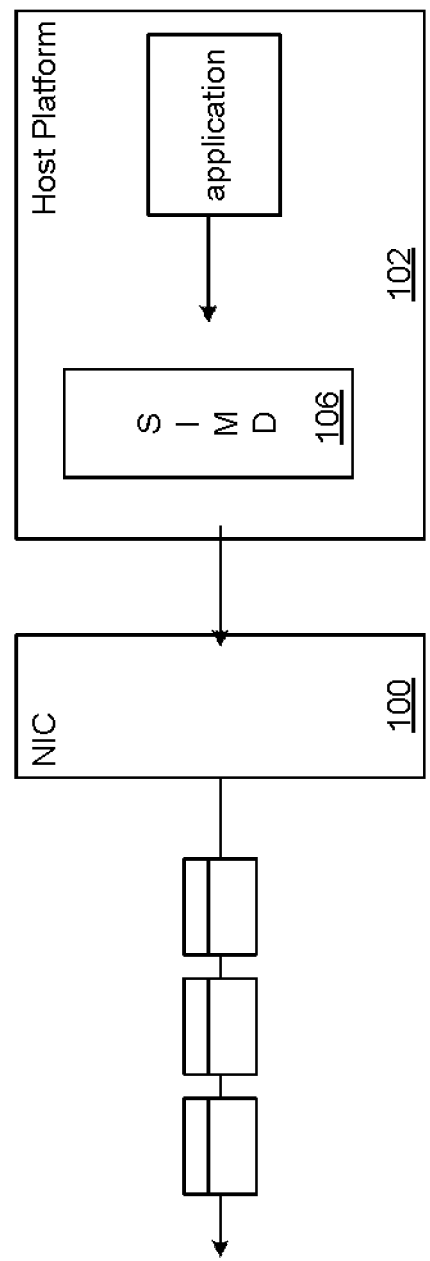
FIG. 4 is a diagram illustrating a transmit operation using SIMD instructions.

While the above described ingress processing of receive packets, SIMD operations may likewise be used for egress processing of packets to be transmitted. For example, as shown in FIG. 4, an application may pass data to transmit to a protocol stack implemented using SIMD instructions. The stack creates packet and metadata vectors for the data. Again, potentially, the representation may feature packet vectors and/or vectors of packet fields. When a vector at the head of the queue is full, when a timer expires, or other event occurs, the vector is processed using SIMD operations and then transferred (e.g., via DMA) to the NIC, along with the transmitted data. The SIMD operations can include generating packet headers for the data, performing segmentation, and so forth. The NIC can then assemble the sequence of bits of a packet for transmission by a PHY. Again, instead of transferring a vector to the NIC, the host platform 102 can transfer discrete packets to interact with traditional NIC operation. Potentially, a NIC driver or operating system may feature instructions to determine whether the NIC can support and/or configure the NIC to handle vector-based communication. The driver may also identify which packet fields of interest should be vectorized, how to transfer data to host platform 102 memory, and so forth.

Implementations may vary widely. Processing of packet vectors may be distributed across multiple hardware threads, cores, dies, virtual machines, partitions, coherent domains, and/or any other such unit of execution. Processing of packet vectors may be distributed such that each packet of the same network flow is processed on the same unit of execution. Microengines, offload engines, copy engines or other logic may be present on the NIC, host system, or CPU which perform simultaneous operations on whole vectors of packets. Additionally, while SIMD processing of packets was described with respect to network packets, the technique can apply broadly to peripheral I/O devices communicating control fields for which the host platform may perform parallelizable computational or logical operations. The techniques may be used, for example, to process SCSI (Small Computer System Interface), iSCSI (Internet SCSI), and/or SATA (Serial Advanced Technology Attachment) packets (e.g., frames or other protocol data units) storing commands, responses, and/or data.

The term circuitry as used herein includes hardwired circuitry, digital circuitry, analog circuitry, programmable circuitry, and so forth. The programmable circuitry may operate on computer programs stored on a computer readable storage medium.

Other embodiments are within the scope of the following claims.

What is claimed is:

1. A method comprising:
providing a single instruction/multiple data (SIMD) program to process a first vector of data wherein each element of the first vector corresponds to a different received packet;
the program comprising instructions which, when executed, cause SIMD processing comprising:
accessing a second vector, wherein each element of the second vector identifies occupancy of a corresponding element in the first vector;
accessing a third vector, wherein each element of the third vector comprises flow state data for a flow of an associated packet in the first vector; and
modifying elements in the third vector; and
wherein the first vector comprises a vector that is not fully occupied and the flow state data comprises Transmission Control Protocol (TCP) flow state data.

2. The method of claim 1, wherein each element of the vector corresponds to a same strict subset of packet header fields.

3. The method of claim 1, further comprising instructions which when executed, cause SIMD processing comprising:
determining a packet should not be processed by the SIMD instructions.

4. The method of claim 1, wherein the SIMD program comprises at least a portion of the program to perform at least one of the following:
determine protocols of the packets;
validate the packets;
compute header values for the packets; and
determine an execution unit to handle the packets.

5. A network interface controller, comprising:
an interface to a PHY;
a Direct Memory Access (DMA) engine to transfer data from the network interface controller to and from a memory;
circuitry to arrange data of the packets into a vector, wherein each element of the vector corresponds to a different packet, for single instruction/multiple data (SIMD) processing of the vector;
wherein the circuitry to arrange data of the packets into a vector comprises circuitry to arrange data of the packets into a vector where each element of the vector corresponds to the same strict subset of packet header fields, wherein the packets comprising Internet Protocol (IP) packets.

6. The network interface controller of claim 5, further comprising circuitry to assign packets to the vector such that the vector includes elements corresponding to multiple packets belonging to the same flow.

7. The network interface controller of claim 5, further comprising circuitry to assign packets to the vector such that the vector does not include elements corresponding to multiple packets belonging to the same flow.

8. A computer program disposed on a non-transitory computer readable medium comprising instructions for causing circuitry to:
access a vector of network packet data, individual vector elements comprising a strict subset of fields of a network packet header, respective vector elements corresponding to different respective network packets; and
cause single instruction, parallel processing of the respective vector elements corresponding to the different respective network packets; and
wherein the network packets comprise Internet Protocol packets.

9. The program of claim 8, wherein the single instruction, parallel processing of the respective vector elements comprises a forwarding lookup.

10. The program of claim 8, wherein the single instruction, parallel processing of the respective vector elements comprises a hash based on data included in the strict subset of fields of the respective network packet header.

11. The program of claim 8, wherein the network packet header comprises a Transmission Control Protocol (TCP) segment header.

12. The program of claim 8, wherein the network packet header comprises an Internet Protocol (IP) datagram header.

13. The program of claim 8, wherein strict subset of fields comprise a field from an Internet Protocol (IP) datagram header.

14. The program of claim 8, wherein the vector elements comprise vector elements in contiguous memory locations.

15. The program of claim 8, wherein the instructions to cause single instruction, parallel processing of the respective vector elements comprise instructions to cause single instruction, parallel processing of the respective vectors for a vector that is not fully populated.

16. The program of 8, wherein the single instruction, parallel processing of the respective array elements comprises updating of flow state data associated with the respective network packets.

17. The program of claim 16, wherein the flow state data comprises an array of flow state data, where respective elements of the array of flow state data correspond to the respective network packets of the array of network packet data.

18. A system comprising:
at least one processor capable of single instruction, parallel processing of vector elements;
logic, when in operation, to:
access a vector of network packet data, individual vector elements comprising a strict subset of fields of a network packet header, respective vector elements corresponding to different respective network packets; and
cause single instruction, parallel processing by the at least one processor of the respective vector elements corresponding to the different respective network packets;
wherein the network packets comprise Internet Protocol packets.

19. The system of claim 18, wherein the single instruction, parallel processing of the respective vector elements comprises a forwarding lookup.

20. The system of claim 18, wherein the single instruction, parallel processing of the respective vector elements comprises a hash based on data included in the strict subset of fields.

21. The system of claim 18, wherein the at least one network packet header comprises an Internet Protocol (IP) datagram header.

22. The program of claim 18, wherein the vector elements comprise vector elements in contiguous memory locations.

23. The program of claim 18, wherein the logic to cause single instruction, parallel processing of the respective vector elements comprises logic to cause single instruction, parallel processing of the respective vectors for a vector that is not fully populated.

* * * * *